(12) United States Patent
Ko et al.

(10) Patent No.: US 9,350,670 B2
(45) Date of Patent: May 24, 2016

(54) NETWORK LOAD ESTIMATION AND PREDICTION FOR CELLULAR NETWORKS

(71) Applicant: International Business Machines Corporation, Armonk, NY (US)

(72) Inventors: Bong Jun Ko, Harrington Park, NJ (US); Vinay Kumar Kolar, Bangalore (IN); Kang-Won Lee, Nanuet, NY (US); Ramya Raghavendra, White Plains, NY (US); Dinesh Verma, Mount Kisco, NY (US); Murtaza Zafer, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 14/258,598

(22) Filed: Apr. 22, 2014

(65) Prior Publication Data
US 2015/0304222 A1 Oct. 22, 2015

(51) Int. Cl.
 H04L 12/801 (2013.01)
 H04L 12/721 (2013.01)
 H04W 28/02 (2009.01)

(52) U.S. Cl.
 CPC ............ *H04L 47/127* (2013.01); *H04L 45/12* (2013.01); *H04L 47/14* (2013.01); *H04W 28/0289* (2013.01)

(58) Field of Classification Search
 None
 See application file for complete search history.

(56) References Cited

U.S. PATENT DOCUMENTS

| 5,561,841 | A | 10/1996 | Markus |
| 6,298,123 | B1 | 10/2001 | Nolting et al. |
| 6,317,599 | B1 | 11/2001 | Rappaport et al. |

(Continued)

FOREIGN PATENT DOCUMENTS

| EP | 1303121 A1 | 4/2003 |
| EP | 2431155 A1 | 3/2012 |

(Continued)

OTHER PUBLICATIONS

Wang, H. et al., "Transportation mode inference from anonymized and aggregated mobile phone call detail records" Intelligent Transportation Systems (ITSC), 2010 13th International IEEE Conference on Digital Object Identifier: 10.1109/ITSC.2010.5625188 Publication Year: 2010 , pp. 318-323.

(Continued)

*Primary Examiner* — Gary Mui
(74) *Attorney, Agent, or Firm* — Fleit Gibbons Gutman Bongini & Bianco PL; Thomas Grzesik

(57) ABSTRACT

Various embodiments estimate network load in a wireless communication network. In one embodiment, at least one call detail record associated with a wireless communication network is received. A topology representing the network is analyzed. The topology includes a plurality of nodes each representing a network element within the wireless communication network. The topology also includes a plurality of edges between two or more of the plurality of nodes. Each of the plurality of edges indicates that the two or more plurality of nodes are communicatively coupled to each other within the network. A set of paths is identified between two or more nodes in the plurality of nodes corresponding to a set of call flow information within the at least one call detail record. A state of each network element represented by the two or more nodes in the set of paths is determined based on the call detail record.

20 Claims, 10 Drawing Sheets

(56) References Cited

U.S. PATENT DOCUMENTS

| | | | |
|---|---|---|---|
| 6,336,035 B1 | 1/2002 | Somoza et al. | |
| 6,970,542 B2 | 11/2005 | Moisey et al. | |
| 6,985,731 B1 | 1/2006 | Johnson et al. | |
| 7,043,661 B2 | 5/2006 | Valadarsky et al. | |
| 7,246,045 B1 | 7/2007 | Rappaport et al. | |
| 7,475,003 B1 | 1/2009 | Madhusudhana et al. | |
| 7,555,261 B2 | 6/2009 | O'Neill | |
| 8,131,300 B2 | 3/2012 | Sartori et al. | |
| 8,135,414 B2 | 3/2012 | Khokhar | |
| 8,229,163 B2 | 7/2012 | Coleman et al. | |
| 8,369,230 B1* | 2/2013 | Croak | H04L 43/08 370/252 |
| 8,391,836 B1 | 3/2013 | Bolot et al. | |
| 8,406,398 B2 | 3/2013 | Gore | |
| 8,861,691 B1 | 10/2014 | De et al. | |
| 2002/0083166 A1* | 6/2002 | Dugan | H04M 15/90 709/223 |
| 2002/0107634 A1 | 8/2002 | Luciani | |
| 2005/0262106 A1* | 11/2005 | Enqvist | H04L 29/06 |
| 2006/0293025 A1* | 12/2006 | Chiou | H04W 4/08 455/405 |
| 2007/0153807 A1 | 7/2007 | Cruz et al. | |
| 2008/0019493 A1 | 1/2008 | Kreckel et al. | |
| 2008/0288427 A1 | 11/2008 | Barson et al. | |
| 2009/0067423 A1* | 3/2009 | Visser | H04L 47/10 370/389 |
| 2009/0207741 A1 | 8/2009 | Takahashi | |
| 2009/0304165 A1* | 12/2009 | Chung | H04M 3/36 379/112.06 |
| 2009/0318132 A1 | 12/2009 | Chiou et al. | |
| 2010/0135476 A1 | 6/2010 | Paden et al. | |
| 2010/0144367 A1 | 6/2010 | Goh et al. | |
| 2010/0261449 A1 | 10/2010 | Mishkin | |
| 2010/0312612 A1 | 12/2010 | Carr et al. | |
| 2011/0184961 A1 | 7/2011 | Aertebjerg et al. | |
| 2011/0295577 A1 | 12/2011 | Ramachandran | |
| 2012/0115505 A1 | 5/2012 | Miyake et al. | |
| 2012/0163225 A1 | 6/2012 | Mishkin et al. | |
| 2012/0178413 A1 | 7/2012 | Schliesser et al. | |
| 2012/0221232 A1 | 8/2012 | Shang et al. | |
| 2012/0270561 A1 | 10/2012 | Giustina et al. | |
| 2012/0284080 A1 | 11/2012 | De Oliveira et al. | |
| 2012/0303413 A1* | 11/2012 | Wang | G06Q 10/0631 705/7.31 |
| 2013/0053055 A1 | 2/2013 | Kumar | |
| 2013/0095817 A1 | 4/2013 | Karla et al. | |
| 2013/0095880 A1 | 4/2013 | Tzamaloukas | |
| 2013/0183996 A1* | 7/2013 | Scarr | H04W 16/04 455/453 |
| 2014/0192676 A1* | 7/2014 | Sullivan | H04L 41/12 370/254 |
| 2015/0004999 A1 | 1/2015 | Schuler et al. | |

FOREIGN PATENT DOCUMENTS

| | | |
|---|---|---|
| EP | 2432155 | 3/2012 |
| EP | 2521288 | 7/2012 |
| WO | 9723085 | 6/1997 |

OTHER PUBLICATIONS

Hohwald, H. et al., "User Modeling for Telecommunication Applications: Experiences and Practical Implications" User Modeling, Adaption, and Personalization. Proceedings 18th International Conference, Digital Object Identifier: 10.1007/978-3-642-13470-8_30. Jun. 20-24, 2010; pp. 327-338.

Zhang, H., et al., "Change Point Detection Based on Call Detail Records," ISI 2009, Jun. 2009, pp. 55-60, 978-1-4244-4173-0/09/ $25.00, copyright 2009 IEEE.

Kavulya, S., et al., "Draco: Top Down Statistical Diagnosis of Large-Scale VoIP Networks," Apr. 2011, Parallel Data Laboratory, Carnegie Mellon University, AT&T Lab—Research, CMU-PDL-11-109.

Fiadino, P., et al., "Steps towards the Extraction of Vehicular Mobility Patterns from 3G Signaling Data," TMA 2012, LNCS 7189, Mar. 2012, pp. 66-80, copyright Springer-Verlag Verlin Heidelberg 2012.

Tzavidas, S., "Channel Measurement-Based Backup of Control Information in Distributed Cellular Architectures," Aug. 17, 2005, pp. 1-5, IPCOM00127010D, Copyright Motorola, Inc. Aug. 17, 2005.

Non-Final Office Action dated Aug. 13, 2015 received for U.S. Appl. No. 14/258,676.

Non-Final Office Action dated Aug. 31, 2015 received for U.S. Appl. No. 14/230,044.

* cited by examiner

| Source Addr | Dest Addr | Duration | Call Vol | Term Code | ... | Source Cell Site ID | Dest Cell Site ID | SGSN ID | GGSN ID | CDR ID | Time Stamp |
|---|---|---|---|---|---|---|---|---|---|---|---|
| 208 | 210 | 212 | 214 | 216 | | 218 | 220 | 222 | 224 | 226 | 228 |
| UE_1 | UE_A | Dur_1 | Vol_1 | N/A | ... | Site_1 | Site_A | SGSN_1 | GGSN_1 | CDR_1 | TS_1 |
| UE_2 | UE_B | Dur_2 | Vol_2 | N/A | ... | Site_1 | Site_B | SGSN_1 | GGSN_1 | CDR_2 | TS_2 |
| ... | ... | ... | ... | ... | ... | ... | ... | ... | ... | ... | ... |
| UE_N | UE_Y | Dur_N | Vol_N | Code_N | ... | Site_N | Site_C | SGSN_N | GGSN_N | CDR_N | TS_N |

202 → (row 1), 204 → (row 2), 206 → (row N)

FIG. 2

NETWORK LOAD ESTIMATION AND PREDICTION FOR CELLULAR NETWORKS

BACKGROUND

The present invention generally relates to wireless communication networks, and more particularly relates to estimating and predicting network load for a wireless communication network.

A cellular network comprises a hierarchy of network elements. For example, a 3G UMTS (Universal Mobile Telecommunication System) cellular network comprises radio access network elements (e.g., cell sites, radio network controller) and core network elements such as SGSN (Serving GPRS Support Node), GGSN (Gateway GPRS Support Node), and MSC (Mobile Switching Center). Network operators typically collect network element information through a monitoring infrastructure. Network monitoring provides invaluable information on network performance, network load, fault detection, etc. Network monitoring also enables network planners to answer questions on topology planning and upgrading. However, fine-grained monitoring is an expensive operation and a cellular service provider generally needs to bear the cost (both financial and overhead of data collection) of monitoring.

BRIEF SUMMARY

In one embodiment, a method for estimating network load in a wireless communication network is disclosed. The method comprises receiving at least one call detail record ("CDR", also referred to as a "call data record") associated with a wireless communication network. A topology representing the wireless communication network is analyzed. The topology comprises a plurality of nodes each representing a network element within the wireless communication network. The topology also comprises a plurality of edges between two or more of the plurality of nodes. Each of the plurality of edges indicates that the two or more plurality of nodes are communicatively coupled to each other within the wireless communication network. A set of paths is identified between two or more nodes in the plurality of nodes corresponding to a set of call flow information within the at least one call detail record. A state of each network element represented by the two or more nodes in the set of paths is determined based on the call detail record.

In another embodiment, a method for estimating network load in a wireless communication network is disclosed. The method comprises receiving at least one call detail record associated with a wireless communication network. A set of call flow information is identified from the at least one call detail record. A set of network inventory information associated with the wireless communication network is analyzed. A set of network elements within the wireless communication network is identified based on the analyzing. A topology of the wireless communication network is created based on the set of call flow information and the set of network elements.

In yet another embodiment, a computer program storage product for estimating network load in a wireless communication network is disclosed. The computer program storage product comprising instructions configured to perform a method. The method comprises receiving at least one call detail record associated with a wireless communication network. A topology representing the wireless communication network is analyzed. The topology comprises a plurality of nodes each representing a network element within the wireless communication network. The topology also comprises a plurality of edges between two or more of the plurality of nodes. Each of the plurality of edges indicates that the two or more plurality of nodes are communicatively coupled to each other within the wireless communication network. A set of paths is identified between two or more nodes in the plurality of nodes corresponding to a set of call flow information within the at least one call detail record. A state of each network element represented by the two or more nodes in the set of paths is determined based on the call detail record.

In another embodiment, an information processing system for estimating network load in a wireless communication network is disclosed. The information processing system comprises a memory and a processor that is communicatively coupled to the memory. An adaptive monitor is communicatively coupled to the memory and the processor. The adaptive monitor is configured to perform a method. The method comprises receiving at least one call detail record associated with a wireless communication network. A topology representing the wireless communication network is analyzed. The topology comprises a plurality of nodes each representing a network element within the wireless communication network. The topology also comprises a plurality of edges between two or more of the plurality of nodes. Each of the plurality of edges indicates that the two or more plurality of nodes are communicatively coupled to each other within the wireless communication network. A set of paths is identified between two or more nodes in the plurality of nodes corresponding to a set of call flow information within the at least one call detail record. A state of each network element represented by the two or more nodes in the set of paths is determined based on the call detail record.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which:

FIG. 2 illustrates various examples of call detail records according to one embodiment of the present invention;

DETAILED DESCRIPTION

Operating Environment

Figure 1:
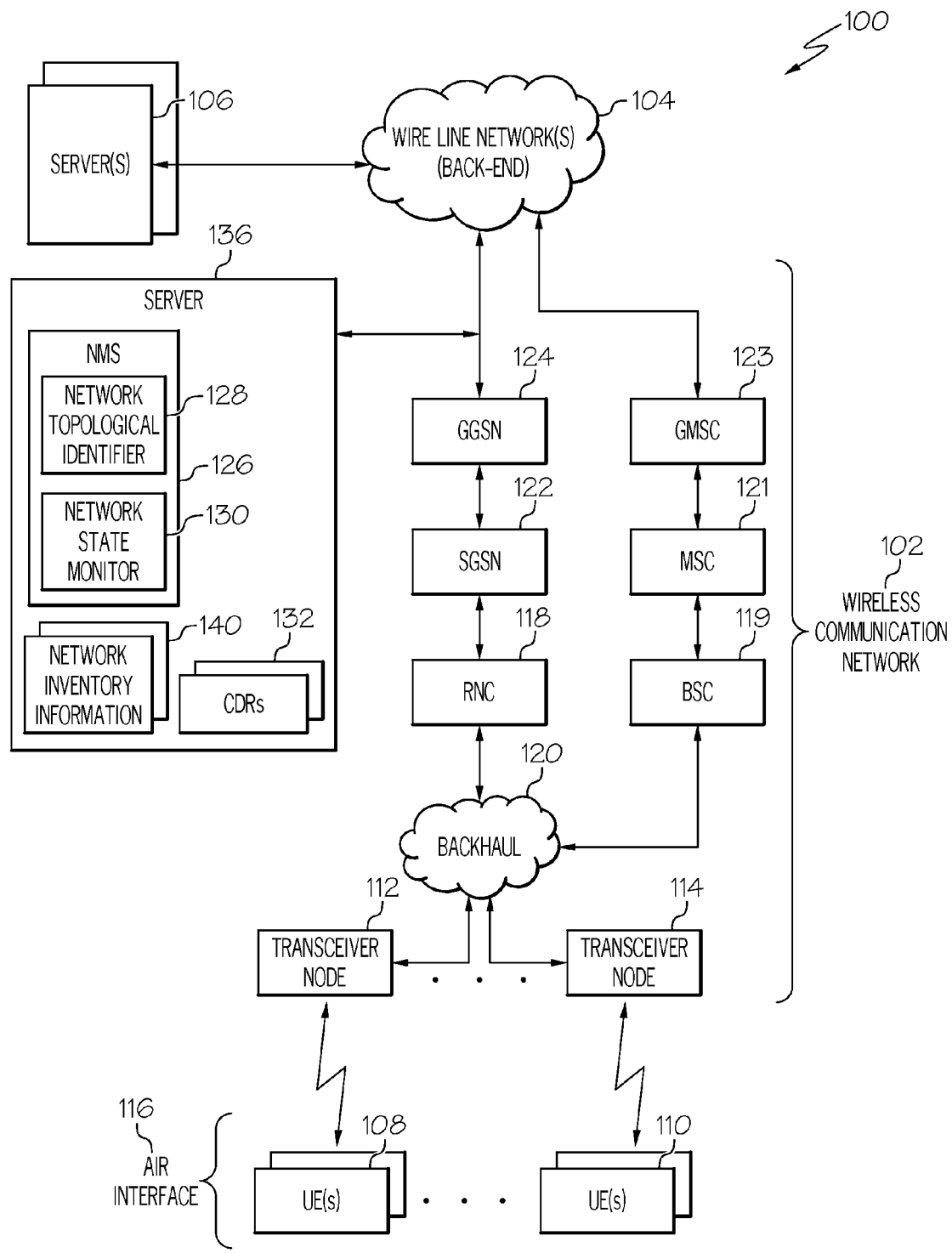
FIG. 1 is a block diagram illustrating one example of an operating environment according to one embodiment of the present invention.

FIG. 1 shows an operating environment 100 according to one embodiment of the present invention. The operating environment 100 comprises one or more wireless communication networks 102 that are communicatively coupled to one or more wire line networks 104. For purposes of simplicity, only the portions of these networks that are relevant to embodiments of the present invention are described. The wire line network 104 acts as a back-end for the wireless communication network 102. In this embodiment, the wire line network 104 comprises one or more access/core networks of the wireless communication network 102 and one or more Internet Protocol (IP) networks such as the Internet. The wire line network 104 communicatively couples one or more servers 106 such as (but not limited to) content sources/providers to the wireless communication network 102. In further embodiments, the back-end is not a wire line network. For example, the back-end takes the form of a network of peers in which a mobile base station/cell site (e.g., eNode B in the case of GSM and its descendants) is itself used as a back-end network for other base stations.

The wireless communication network 102 supports any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication network 102 includes one or more networks based on such standards. For example, in one embodiment, the wireless communication network 102 comprises one or more of a Long Term Evolution (LTE) network, LTE Advanced (LTE-A) network, an Evolution Data Only (EV-DO) network, a GPRS network, a Universal Mobile Telecommunications System (UMTS) network, and the like.

FIG. 1 further shows that one or more user devices (also referred to herein as "user equipment (UE)") 108, 110 are communicatively coupled to the wireless communication network 102. The UE devices 108, 110, in this embodiment, are wireless communication devices such as two-way radios, cellular telephones, mobile phones, smartphones, two-way pagers, wireless messaging devices, laptop computers, tablet computers, desktop computers, personal digital assistants, and other similar devices. UE devices 108, 110 access the wireless communication network 102 through one or more transceiver nodes 112, 114 using one or more air interfaces 116 established between the UE devices 108, 110 and the transceiver node 112, 114.

In another embodiment, one or more UE devices 108, 110 access the wireless communication network 102 via a wired network and/or a non-cellular wireless network such as, but not limited to, a Wireless Fidelity (WiFi) network. For example, the UE devices 108, 110 can be communicatively coupled to one or more gateway devices via wired and/or wireless mechanisms that communicatively couples the UE devices 108, 110 to the wireless communication network 102. This gateway device(s), in this embodiment, communicates with the wireless communication network 102 via wired and/or wireless communication mechanisms.

The UE devices 108, 110 interact with the wireless communication network 102 to send/receive voice and data communications to/from the wireless communication network 104. For example, the UE devices 108, 110 are able to wirelessly request and receive content (e.g., audio, video, text, web pages, etc.) from a provider, such as the server 106, through the wireless communication network 102. The requested content/service is delivered to the wireless communication network 102 through the wire line network 104.

A transceiver node 112, 114 is known as a base transceiver station (BTS), a Node B, and/or an Evolved Node B (eNode B) depending on the technology being implemented within the wireless communication network 104. Throughout this discussion a transceiver node 112, 114 is also referred to as a "base station". The base station 112, 114 is communicatively coupled to one or more antennas and a radio network controller (RNC) 118 and/or base station controller (BSC) 119, which manages and controls one or more base station 112, 114. It should be noted that in a 4G LTE network, the eNodeB communicates directly with the core of the cellular network.

The RNC 118 and/or BSC 119 can be included within or separate from a base station 112, 114. The base stations 112, 114 communicate with the RNC 118 over a backhaul link 120. In the current example, a base station 112, 114 is communicatively coupled to a Serving GPRS (SGSN) 122, which supports several RNCs 118. The SGSN 122 is communicatively coupled to Gateway GPRS Support Node (GGSN) 124, which communicates with the operator's service network (not shown). The operator's service network connects to the Internet at a peering point. It should be noted that even though UMTS components are illustrated in FIG. 1 embodiments of the present invention are applicable to other wireless communication technologies as well.

In another example, the base stations 112, 114 communicate with the BSC 119 over the backhaul link 120. In this example, a base station 112, 114 is communicatively coupled to a mobile switching center (MSC) 121, which supports several BSCs 119. The MSC 121 performs the same functions as the SGSN 122 for voice traffic, as compared to packet switched data. The MSC 121 and SGSN 122 can be co-located. The MSC 121 is communicatively coupled to a gateway mobile switching center (GMSC) 123, which routes calls outside the mobile network.

In one example, the communication protocols between the UE devices 108, 110 and the GGSN 124 are various 3rd Generation Partnership Project (3GPP) protocols over which the internet protocol (IP) traffic from the UE devices 108, 110 is tunneled. For example, a GPRS tunneling protocol (GTP) is utilized between the RNC 118 and the GGSN 124. A standard Internet Protocol (IP) is utilized between the GGSN 124 and the wire line network 104. The server(s) 106 has a TCP (Transmission Control Protocol) socket that communicates with a TCP socket at the UE devices 108, 110 when a user wishes to access data from the server 106. An IP tunnel is created from the GGSN 124 to UE devices 108, 110 for user traffic and passes through the interim components, such as the RNC 118 and the SGSN 122.

A network monitoring system (NMS) 126, in one embodiment, is implemented within or communicatively coupled to the wireless communication network 102. The NMS 126, in one embodiment, comprises a network topology identifier (NTI) 128 and a network state monitor (NSM) 130. Each of these components is discussed in greater detail below. The NMS 126 and its components are configured to construct a topology of the network 102 based on network data such as (but not limited to) call detail records (CDRs) 132 and network inventory information 134. It should be noted that CDRs can also be referred to as "charging data records" or "call data records". The constructed topology identifies the elements of the network 102 and how they are coupled/linked together. Topologies can be created/updated in real-time (as CDRs are generated and received); at given intervals of time; after a given number of CDRs have been received; after a given period of time has elapsed since the previous topology was created, etc. Once the topology is determined, the NMS 126 utilizes the CDRs 128 to monitor the state of the network 102 and its elements. The topology and monitored states can be used, for example, to identify bottlenecked network elements. In addition, an analysis of the topology and monitored states can be performed to assist in network planning. For example, a "what if" analysis can be performed on the topology and monitored states to determine potential changes in the network load, performance, and/or the like if network elements were added, removed, or changed.

In one embodiment, the NMS 126 and its components are located within one or more servers 136. In other embodiments, the NMS 126 (or at least one of its components) resides at the source of the CDRs 132 (e.g., the MSC 121 and/or the SGSN 122). The server 136, in one embodiment, is a datacenter that receives CDRs 132 from a network element such as the MSC 121 and/or the SGSN 122 for billing purposes. The server 136, in one embodiment, stores CDRs 132 for a given period of time. Stated differently, the server 136 stores and maintains historical CDR data for a given amount of time. In addition to CDR data, the server 136 can also include other information such as records of user addresses, user billing plans, etc.

Network Topology Construction and Monitoring

As discussed above, the monitoring of network elements can be a costly task for network operators. Therefore, the NMS 126 utilizes CDRs 132 to monitor the network 102 and its elements. Utilizing CDRs 132 to monitor the network 102 is advantageous since additional monitoring probes are not required, which are expensive to implement and maintain. In addition, the utilization of CDRs 132 to perform monitoring operations does not require any changes or additional control data within current network systems.

In one embodiment, the NMS 126 obtains a plurality of CDRs 132 and constructs a topology (or at least a partial topology) of the network 106 based on the information within the CDRs 132. A CDR 132, in one embodiment, is a formatted measure of a UE's service usage information (placing a phone call, accessing the Internet, etc.). For example, a CDR 132 includes information related to a voice or data call such as (but not limited to) the origination and destination addresses of the call; the time the call started and ended; the duration of the call; the time of day the call was made; call termination and error codes; and other details of the call. A CDR 132 also comprises some (partial) information about which network elements handled the particular call including, but not limited to, source/origination cell site (base station) identifiers and destination cell site identifiers. A CDR 132 is typically generated by one or more network functions that supervise, monitor, and/or control network access for the device, such as the MSC 121 for voice calls and the SGSN 122 for data calls.

FIG. 2 shows various examples of CDR records. In the example of FIG. 2 each row 202, 204, 206 corresponds to a separate CDR. In this example, each CDR 202, 204, 206 comprises entries identifying flow information such as (but not limited to) the source/origination address 208 of the call (e.g., phone number of UE that made the call); the destination address 210 of the call (e.g., phone number of UE to which the call was placed); temporal information 212 (e.g., duration, start and end times, etc.) associated with the call; the data volume 214 of the call; and call termination and error codes 216. Each CDR 202, 204, 206 also comprises entries comprising partial network information such as (but not limited to) a source cell site identifier (ID) 218; and a destination cell site ID 220; the ID 222 of the SGSN that handled the call; and the ID 224 of the GGSN that handled the call. FIG. 2 also shows that a CDR can comprise information specific to the CDR itself such as (but not limited to) an ID 226 uniquely identifying the CDR and a time stamp 228 identifying when the CDR was generated. It should be noted that another example of a CDR format is provided by the 3GPP specification 32.297 (see 3gpp.org/ftp/Specs/html-info/32297.htm), which is hereby incorporated by reference.

Even though a CDR reports a variety of information regarding a call this information generally comprises flow-oriented data (e.g., source and destination locations and a few network elements that are on the call flow). Information regarding the network elements that handled a call is generally limited within CDRs. For example, a 3G data download record may only include network information such as the cell site that a caller is connected to, and the corresponding IDs of the SGSN and GGSN that handled the data connection, as shown in FIG. 2. Many of the network elements that were involved in the call handling are generally not exposed in the CDR. For example, RNC (Radio Network Controller) information is typically missing from CDRs reported by core network elements. Also, the network elements in the underlying IP network (e.g., switches and routers) that provide the IP connectivity inside the cellular network infrastructure are usually not identified in CDRs. Accordingly, the topology created by NMS 126, based on the CDRs 132 alone, may only be a partial topology in some instances.

Therefore, the NMS 126, in one or more embodiment, utilizes network inventory information 134 to identify/infer the elements that are not a part of a CDR 132, which are herein referred to as "hidden elements". This embodiment enables the NMS 126 to obtain a more complete view of the network 102. Network inventory information 136 is generally static and comprises a list of the various network components deployed within the wireless communication network 102 (or one or more sub-networks coupled thereto). For example, network inventory information 134 comprises information such as, but not limited to, identifiers of network elements, location information of network elements, connection/link information for network elements, etc. Network inventory information 134 is maintained by, for example, the network operator.

Figure 3:
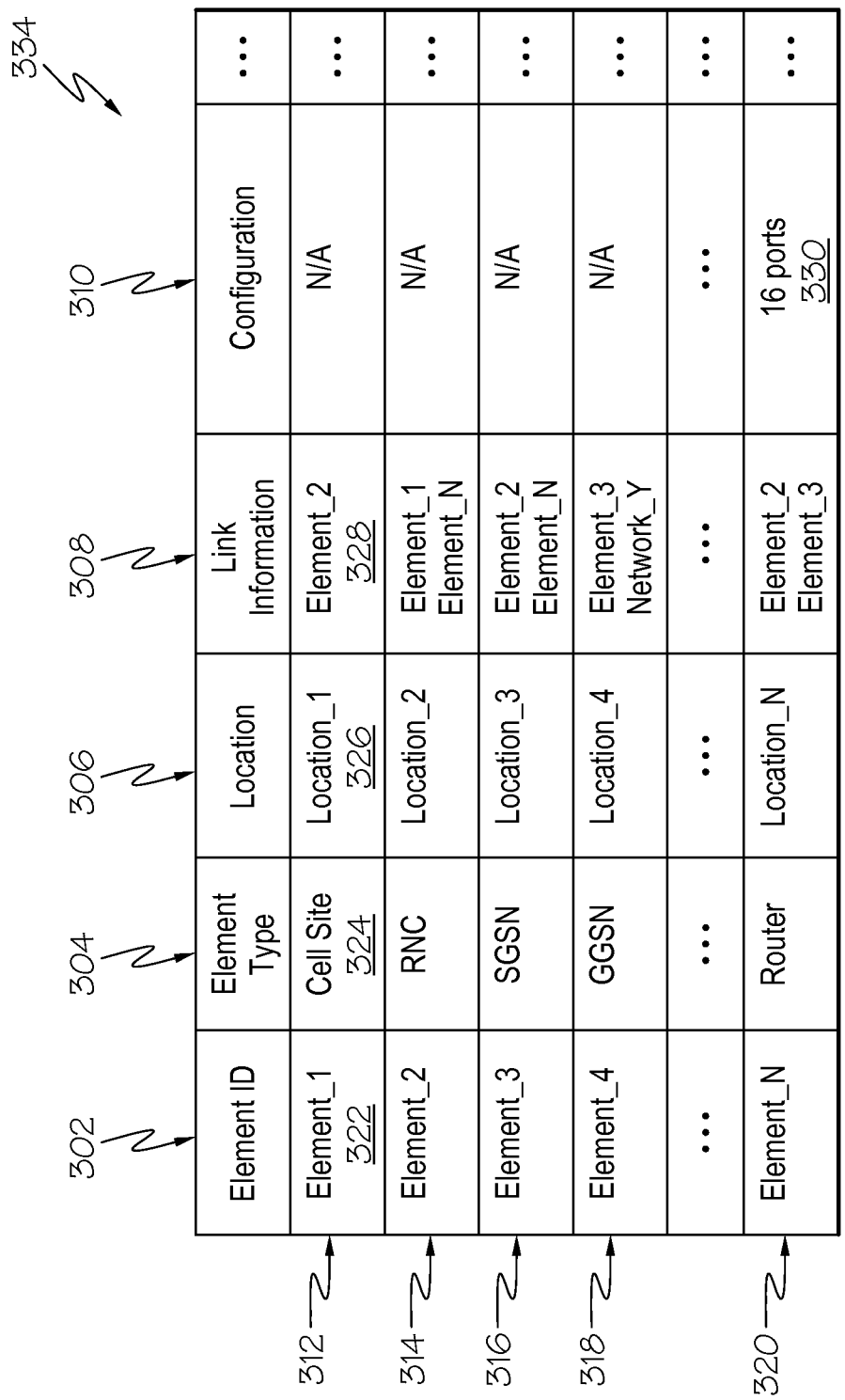
FIG. 3 illustrates one example of network invention information according to one embodiment of the present invention.

FIG. 3 shows one example of network inventory information 334. In the example of FIG. 3, the network inventory information 330 comprises an "Element ID" column 302; an "Element Type" column 304; a "Location" column 306; a "Link Information" column 308; and a "Configuration" column 310. Each row 312, 314, 316, 318, 320 of the network inventory information 330 corresponds to a given network element within the network 102. The "Unique ID" column 302 comprises entries 322 that include a unique identifier of the corresponding network element. The "Element Type" column 304 comprises entries 324 identifying the element type of corresponding network element. For example, the first entry 324 under the "Element Type" column 304 identifies the corresponding network element as a cell site.

The "Location" column 306 comprises entries 326 identifying the location of corresponding network element. Location information can include any type of information such as (but not limited to) global positioning satellite coordinates that identifies the location of the network element. The "Link Information" column 308 comprises entries 328 identifying any link information associated with the corresponding network element. For example, in the example of FIG. 3 the first entry 328 under the "Link Information" column 308 indicates that Element_1 is communicatively coupled to Element_2. Other information such as (but not limited to) the type of link, link capacity, and/or the like can also be included in the "Link Information" column 308. The "Configuration" column 310 comprises entries 330 with configuration/parameter information associated with the corresponding network element. For example, the last entry 330 under the "Configuration" column 310 indicates that the router element associated with this entry comprises 16 ports. It should be noted that the configuration information can include any information associated with the hardware and/or software of the corresponding network element.

The NTI 128 of the NMS 126 combines the flow/link information from one or more CDRs 132 with the network inventory information 134 to infer the hidden network elements, and subsequently construct a topology of the network 102. This topology comprises network elements identified from the CDRs 132 and inferred/identified from the network inventory information 134. The topology also comprises links between each network element.

As an illustration, consider one example where the NMS 126 obtains at least one CDR 132. The NTI 128 of the NMS 126 analyzes the CDR 132 and determines that the CDR 132 identifies the UE (UE_A) that initiated the call, the source cell site (SITE_A) and the SGSN/GGSN (SGSN_A and GGSN_A) that handled the corresponding call. Therefore, based on the obtained CDR 132 the NTI 128 is able to construct a topology of the network 102 comprising at least UE_A, SITE_A, SGSN_A, and GGSN_A with a link between UE_A and SITE_A, a link between SITE_A and SGSN_A and a link between SGSN_A and GGSN_A. In one embodiment, the NTI 128 determines which network elements are linked to each other based on its knowledge of wireless communication networks. For example, the NTI 128, in one embodiment, is pre-configured with topology information such that it knows UEs communicate with cell sites, cell sites communicate with RNCs, RNCs communicate with SGSNs, SGSNs communicate with GGSNs, GGSNs communicate with one or more external networks, etc. Based on this knowledge, the NTI 128 determines a link exists between UE_A and SITE_A, between SITE_A and SGSN_A, and between SGSN_A and GGSN_A, and between GGSN_A and an external network (NETWORK_A) such as, but not limited to, the Internet.

Figure 4:
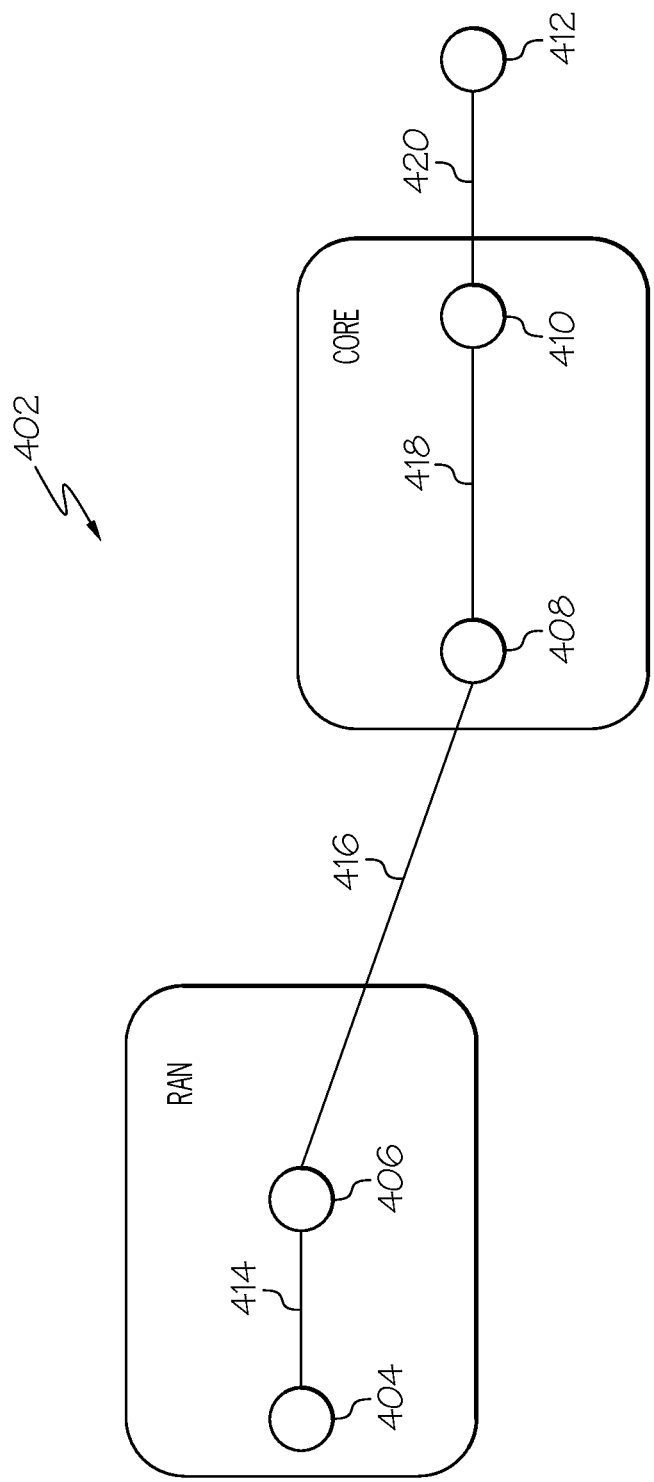
FIGS. 4-7 illustrates various examples of network topologies according to one embodiment of the present invention.

FIG. 4 shows one example of the topology 402 that can be generated by the NTI 128 based on the obtained CDR(s) 132. In one embodiment, the NTI 128 generates a topology by utilizing a node to represent each identified network element and an edge between each node to represent a link between each network element. In FIG. 4, the topology 402 comprises a first node 404 representing UE_A, which generated the call and a second node 406 representing SITE_A. In this example, the network elements represented by the first and second nodes 404, 406 are within the Radio Access Network (RAN) portion of the wireless communication network 102. The topology 402 of FIG. 4 also comprises a third node 408 representing SGSN_A and a fourth node 410 representing GGSN_A. In this example, the network elements represented by the third and fourth nodes 408, 410 are within the Core Network portion of the wireless communication network 102. The topology 402 further comprises a fifth node 412 representing NETWORK_A. The topology 402 also comprises a link 414 between UE_A and SITE_A, a link 416 between SITE_A and SGSN_A, a link 418 between SGSN_A and GGSN_A, and a link 420 between GGSN_A and NETWORK_A.

As can be seen from FIG. 4, intermediate elements such as the RNC 118 are missing from the topology 402 since this information was not in the obtained CDR(s) 132. However, the NMS 126 not only utilizes the information within a CDR(s) 132 to construct the topology of the network 102, but also utilizes network inventory information 134, as discussed above. For example, the NTI 128 of the NMS 126 analyzes a set of network inventory information 134 to infer/identify any of the hidden elements that were not identified within the obtained CDR(s) 132. In this example, the NTI 128 determines that an RNC (RNC_A) is also part of the network 102 based on the set of network inventory information 134. The NTI 128 also determines that RNC_A is coupled to SITE_A and SGSN_A based on link information within the set of network inventory information 134. It should be noted that network inventory information 134 is not required to include link information. For example, the NTI 128 can be preconfigured with topology information such that it knows an RNC is linked with a cell site and an SGSN.

Figure 5:
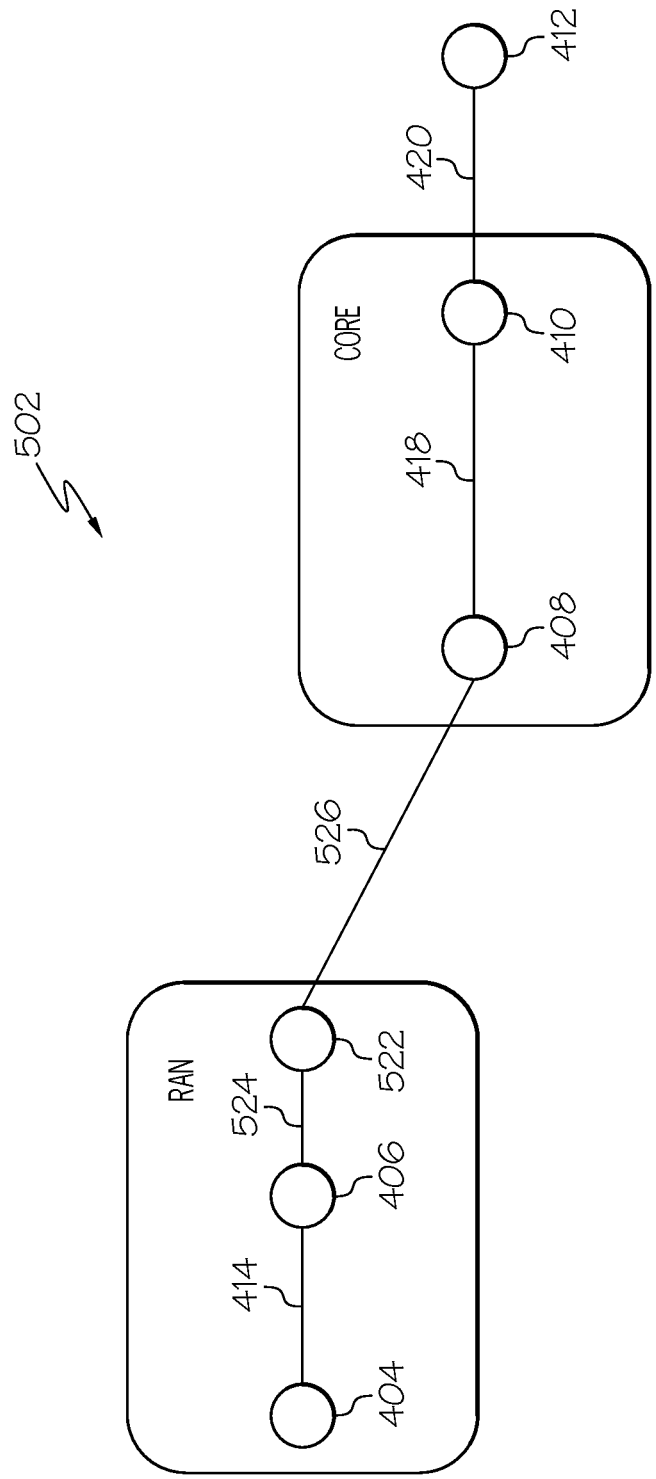

Therefore, based on the additional information provided by the set of network inventory information 134, the NTI 128 generates a more detailed and complete network topology 502, as shown in FIG. 5. This topology 502 now comprises additional nodes 522 for any hidden elements such RNC_A that were identified from the set of network inventory information 130. The topology 502 of FIG. 5 also comprises links between any of the identified hidden elements and one or more other elements within the network 102. For example, FIG. 5 shows a link 524 between SITE_A and RNC_A and a link 526 between RNC_A and SGSN_A.

It should be noted that, in some embodiments, hidden elements also include Internet Protocol (IP) based elements such as routers and switches that connect radio access network (RAN) elements to core network elements. For example, consider one embodiment where the RAN elements (e.g., UE 108, base station 112, RNC 118, etc.) are connected to the core network elements (e.g., SGSN 122, GGSN 124, etc.) via a standard IP-based topology (or by a SONET architecture). In this embodiment, the NTI 128 infers/identifies hidden IP-based elements (such as routers and switches) and their links in addition to any RAN-based or core network-based hidden elements when analyzing the set of network inventory information 130.

Figure 6:
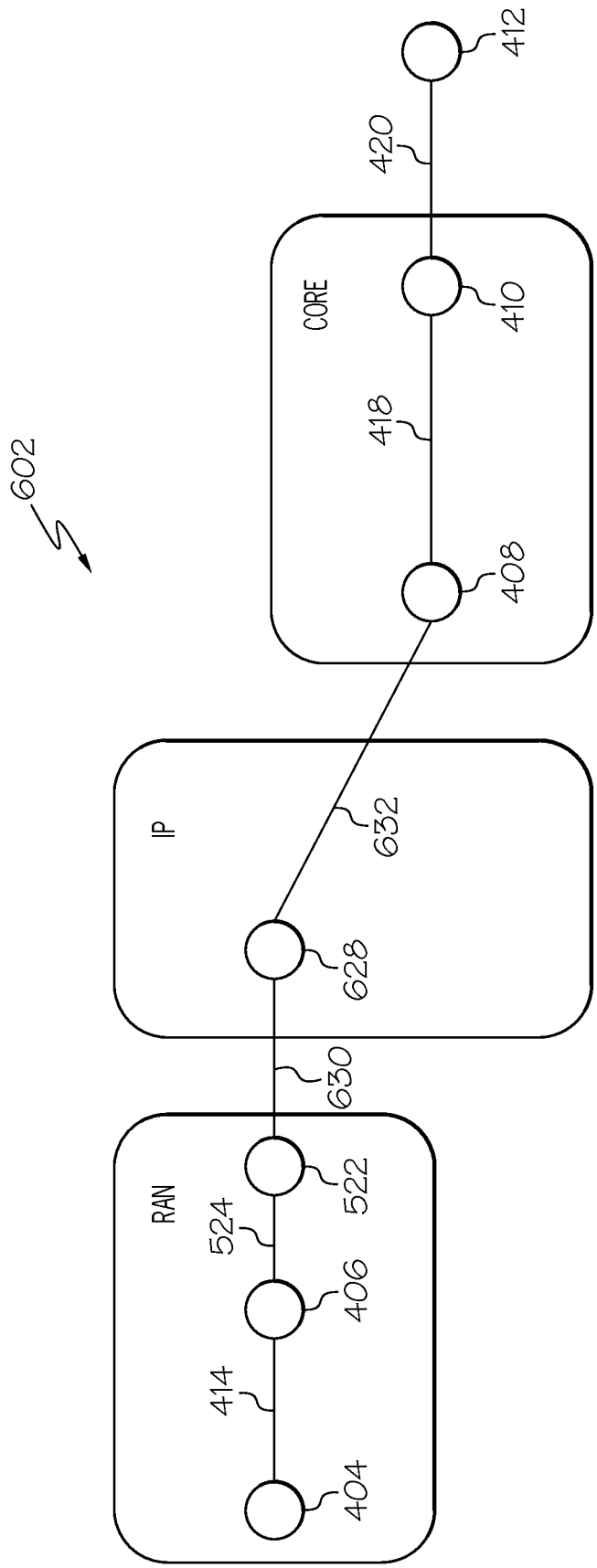

FIG. 6 shows a topology 602 of the wireless network 102 generated by the NTI 128 that includes IP-based elements identified from the set of network inventory information 134. For example, in addition to the nodes 404, 406, 408, 410, 412, 522 representing the UE_A, SITE_A, RNC_A, SGSN_A, GGSN_A, and NETWORK_A discussed above, the topology 602 of FIG. 6 also comprises nodes 628 representing any hidden IP-based elements such as (but not limited to) a router (ROUTER_A). The topology 602 of FIG. 6 further comprises a link 630 between the RNC_A and ROUTER_A and a link 632 between ROUTER_A and SGSN_A.

It should be noted that IP-based elements such as routers and switches can have links between multiple network elements since many of these elements comprises a plurality of ports. In some embodiments, the network inventory information 134 identifies the RAN network elements and core network elements that are communicatively coupled to a given IP-based network element. However, in other embodiments, the network inventory information 134 may not provide this information. In this embodiment, the NTI 128 identifies the configuration (e.g., number of ports) of each of the IP-based hidden elements from the set of network inventory information 130. The NTI 128 then generates links in the topology between one or more RAN/IP-based network elements and one or more core/IP-based network elements based on the identified configuration of each IP-based network element.

Figure 7:
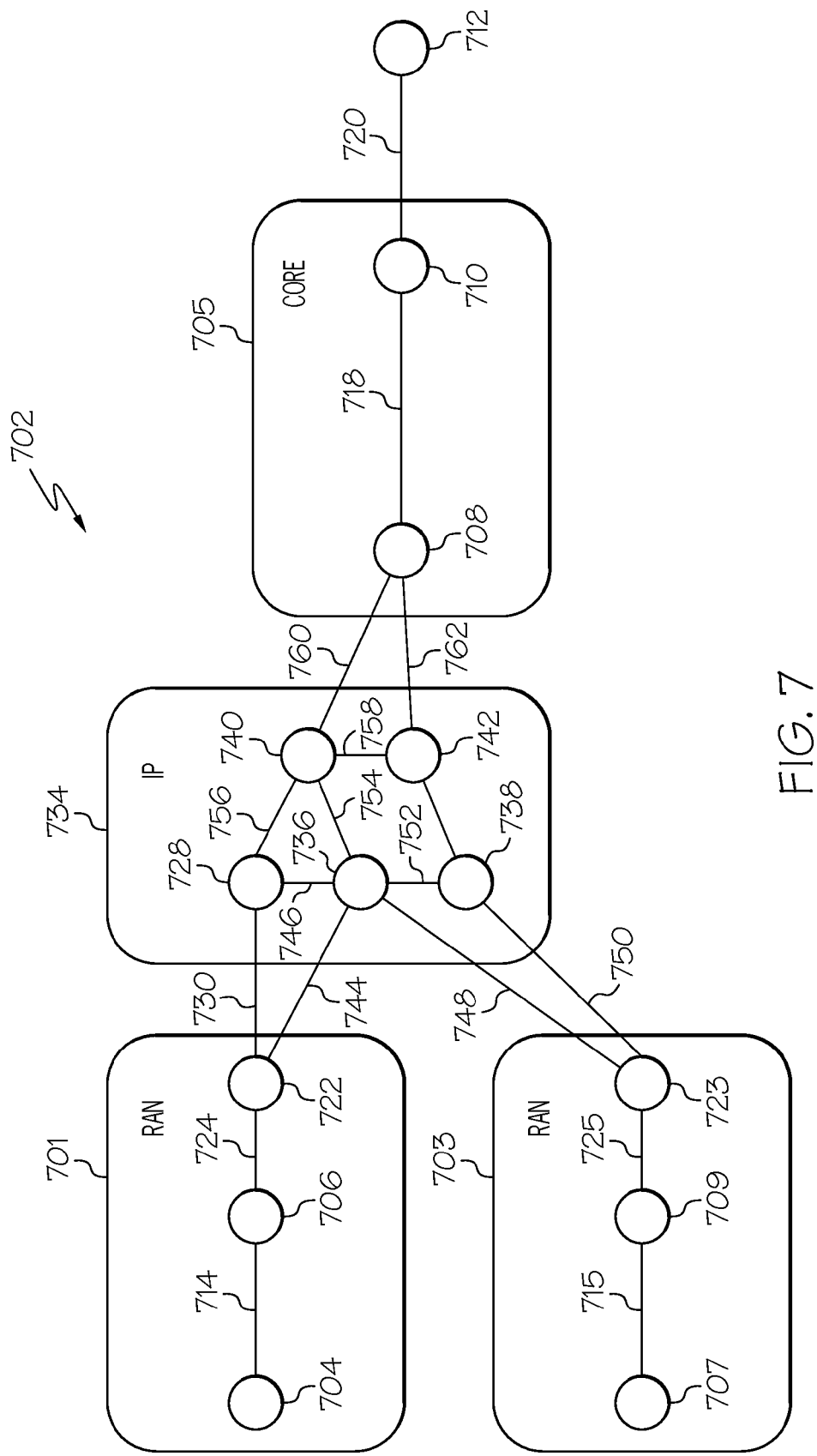

For example, FIG. 7 shows a topology 702 generated by the NTI 128 that comprises multiple RAN networks 701, 703 and a core network 705. Each of the RAN networks 701, 703 comprises a set of nodes 704, 707 representing one or more UEs (e.g., UE_A and UE_N), a set of nodes 706, 709 representing one or more cell sites (e.g., SITE_A and SITE_N), a set of nodes 722, 723 representing one or more RNCs (e.g., RNC_A and RNC_N), and their respective links 714, 715, 724, 725. The core network 705 comprises a set of nodes 708 representing one or more SGSNs (e.g., SGSN_A), a set of nodes 710 representing one or more GGSNs (e.g., GGSN_A), and their respective links 718, 720. The topology 702 also includes a set of nodes 712 representing one or more external networks (e.g., NETWORK_A) and their links 720 coupled to the one or more GGSNs.

The topology 702 of FIG. 7 also comprises an IP-based network 734 that communicatively couples each of the RAN networks 701, 703 to the core network 705. The IP-based network 734 comprises a plurality of elements such as (but not limited to) routers and switches 728, 736, 738, 740, 742. Based on the set of network inventory information 134 analyzed by the NTI 128, the NTI 128 determines that the IP-based elements 728, 736, 738, 740, 742 each comprise a given number of ports. Therefore, the NTI 128 generates an IP-based portion of the topology 702 based on the number of elements in the RAN and core networks 701, 703, 705 and the number of ports available at each of the elements within the IP-based network 734. For example, if an IP-based network element has 4 ports then the NTI 128 generates up to 4 links between the IP-based network elements and network elements from the RAN networks 701, 703, the core network 705, and/or the IP-based network 730. The topology of FIG. 7 shows examples of these various links 744 to 762.

Once the topology of the network 102 has been inferred/determined from one or more CDRs 132 and network inventory information 134 the NSM 126 determines a dynamic state of the network (as a whole) or one or more of its elements based a set of CDRs 132. In this embodiment, the NSM 130 of the NMS 126 determines the set of paths that are possible between the network elements identified in the topology generated by the NTI 128. For example, the NSM 130 determines each possible path between a base station (cell site) 112 and a GGSN 124 within the topology. In one embodiment, the NSM 130 utilizes one or more path graphing algorithms such as (but not limited to) "all paths" or "all shortest paths" graph algorithms to determine the paths. For example, modified, Dijkstra, Bellman-Ford, A*, etc. search algorithms can be utilized to identify the paths. In addition, such paths can also be refined if the input about network routing policies are provided (e.g., which switch or gateway is the ingress or egress point for the network element). It should be noted that the term "shortest path" refers to the path between two nodes (network elements) such that the sum of the weights of its constituent edges is minimized. It should also be noted that in a pure hierarchical network there is only one path between a base station 112 (cell site) and a GGSN.

The NSM 130 converts a received CDR 132 into a path in the network. In this embodiment, the CDR 132 comprises information about the "path". For example, a CDR 132 for a placed call can specify the cell-site (C) and SGSN (S) and GGSN (G) were used to handle this call. Thus, C-S-G forms a path. The path can then be enhanced by fusing the information about the path of hidden network elements between C-S and S-G, which were previously identified as discussed above. Therefore, the NSM 130 is able to identify at least the cell site, SGSN, and GGSN for a call from the CDR 132. Based on this information, the NSM 130 can identify a subset of paths from the set of all possible paths that a given call associated with a CDR may have taken. This subset of paths comprises paths from the set of all possible paths that include the cell site, SGSN, GGSN, etc. identified from the received CDR 132.

It should be noted that 3G/4G architectures may not be purely hierarchical and may resemble a mesh network to provide redundant paths for load balancing and availability. In this situation, the NSM 130 pre-computes all the paths between the network end points. Then, for each call associated with a CDR, the call information into is converted into path information, as discussed above. The NSM 130 assigns each call to a path such that the load is balanced balance across all the available paths that the call may have taken.

In one embodiment, the pre-computation process utilizes the path computation algorithms to compute all the paths between any cell-site (C), SGSN (S), and GGSN (G). If the NSM 130 knows what protocols are used between cell sites, SGSN, and GGSN, the NSM 130 can precisely compute which network elements were on the path. Even if protocol information is not available, the NSM 130 can assign the "most probable route" among all the possible paths that connects cell-site (C), SGSN (S), and GGSN (G) based on the common routing policies typically used by network operators (e.g., shortest path algorithm).

The NSM 130 then calculates the load on each network element for the identified "most probable route" in the subset of paths associated with a call. In another embodiment, the NSM 130 calculates the aggregate load on all network elements in the entire network 102. In one embodiment, the NSM 130 determines/estimates the load for each network element in a given path based on the data within the CDRs 130. For example, CDRs 130 include call volume data, which indicates the amount of data being transmitted and received by a UE during a call. The NSM 130 utilizes this information to determine the load being experienced by each network element. If the CDR 132 indicates that a specific network element (cell site, router, SGSN) handled X bytes of data for a single call, then this amount is added to the overall amount of data that the element has processed. By repeating this above, the NSM 130 computes the load of each network element (including routers, RNCs, etc.)].

In one embodiment, the NSM 130 determines the total load of a given element for a given period of time as the sum of all calculated loads (i.e., the sum of each load calculated based on each received CDR 132) for that element. The total load across the network elements (i.e., the state of the entire network 102 or the state of a given path) is the sum of the total loads for each element. It should be noted that load can be determined for different granularities. For example, the average load per call, minute, day, etc. can be determined for each network element, a combination of elements, and/or the entire network 102. The load information is stored for future processing and/or review by the network operator(s).

In one embodiment, the NMS 126 utilizes the inferred network topology and the determined states of the network elements for further analysis of the network. For example, in one embodiment, the NMS 126 utilizes the inferred topology and calculated network element loads to perform a "what-if analysis" on network elements to predict network performance. For example, if a given area of the topology is experiencing a load that is greater than a given threshold additional elements such as (but not limited to) a GGSN can be added to the topology. The NMS 126 can perform a simulation as to how the addition of network elements to the topology affects the loads experienced by other elements and the network as a whole.

In one embodiment, the simulation process is performed by using techniques in regular event-based simulators. For example, the NMS 126 first modifies the network topology to include the new network element that has been added. The NMS 126 then computes a new CDR with the added network element and loads (based on CDRs that were observed in real data). In this embodiment, the NMS 126 computes new CDRs according to a model where a fraction of the CDRs are routed through the old network element and the remaining CDRs are routed through the new network element. For example, if a new GGSN (GN) has been added to load-balance the load to the old GGSN (GO), then the NMS 126 simulates the data such that some load (based on the model of load-balancing) is routed to GN and some load is routed to GO.

If an intermediate hidden element has been added, the NMS 126 does not change the cell-site, GGSN, and SGSN, in the CDR. The NMS 126 then computes the new possible paths in this new graph using the process discussed above. The NMS 126 can then use a simulator (e.g., event-driven network simulator) to simulate the loads on this new graph with these new network elements and the path. This simulation provides a new estimate of the load on each network element. Therefore, the NMS 126 can simulate a "what-if" analysis where it can foresee the changes that may happen if a new network element is added to the network 102.

Alternatively, other network configuration parameters can be changed in the topology such as upgrading an optical link to a higher capacity link; changing the microwave link between a first base station and a second base station to a type of optical link; etc. The NMS 126 can then perform one or more simulations to determine how the network load would be affected by these changes made to the topology. The updated load information is stored for future processing and/or review by the network operator(s).

Operational Flow Diagrams

Figure 8:
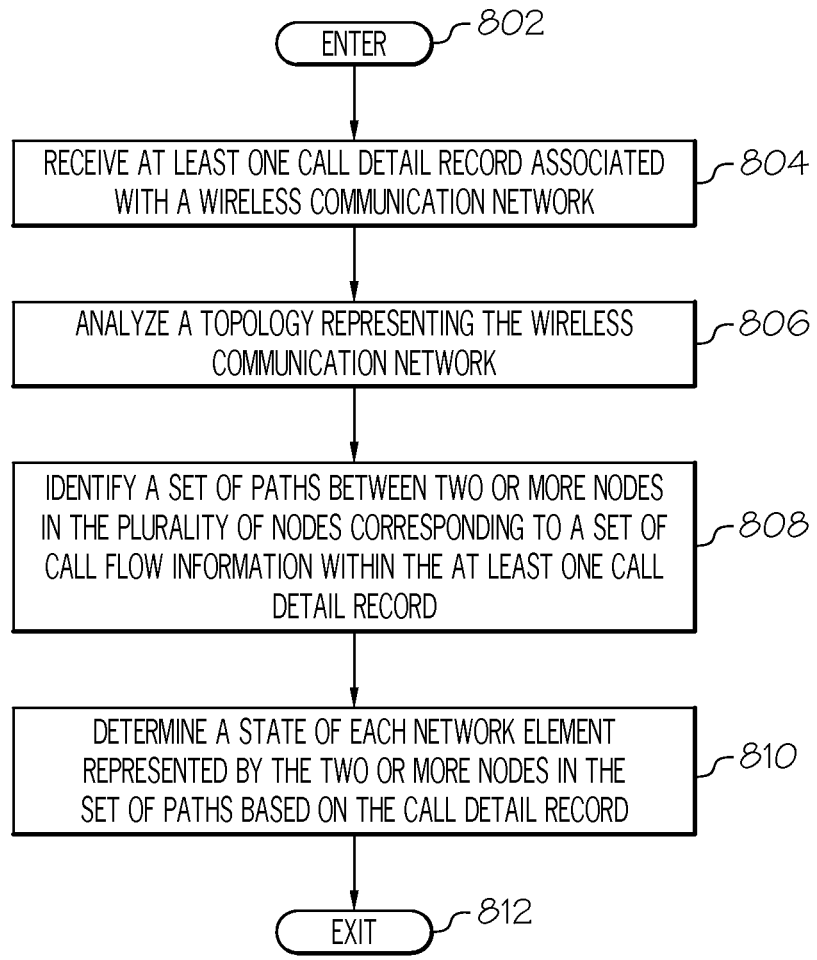
FIG. 8 is an operational flow diagram illustrating one example of estimating network load in a wireless communication network according to one embodiment of the present invention.

FIG. 8 is an operational flow diagram illustrating one example of estimating network load in a wireless communication network. The operational flow diagram of FIG. 8 begins at step 802 and flows directly to step 804. The NMS 126, at step 804, receives at least one call detail record 132 associated with a wireless communication network 102. The NMS 126, at step 806, analyzes a topology representing the wireless communication network. The topology comprises a plurality of nodes each representing a network element within the wireless communication network 102. The topology also comprises a plurality of edges between two or more of the plurality of nodes. Each of the plurality of edges indicates that the two or more plurality of nodes is communicatively coupled to each other within the wireless communication network 102. The NMS 126, at step 808, identifies a set of paths between two or more nodes in the plurality of nodes corresponding to a set of call flow information within the at least one call detail record 132. The NMS 126, at step 810, determines a state of each network element represented by the two or more nodes in the set of paths based on the call detail record 132. The control flow exits at step 812.

Figure 9:
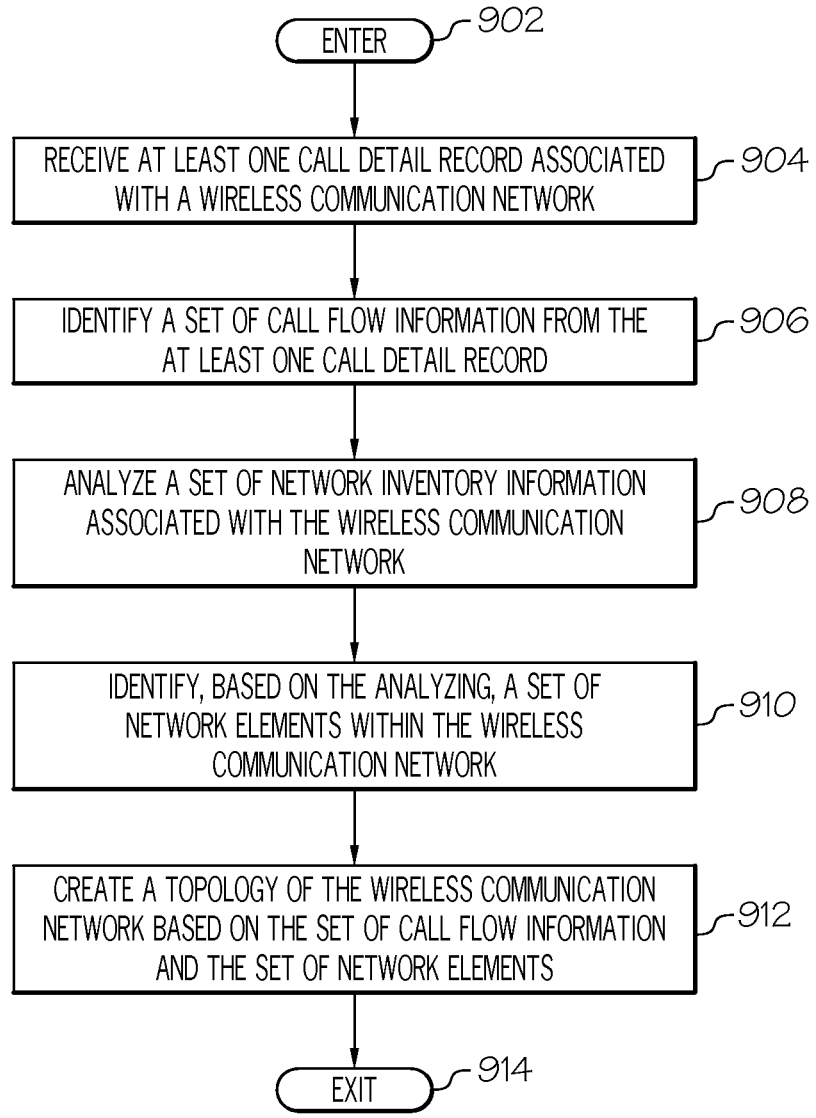
FIG. 9 is an operational flow diagram illustrating one example of determining a network topology in a wireless communication network according to one embodiment of the present invention.

FIG. 9 is an operational flow diagram illustrating another example of estimating network load in a wireless communication network. The operational flow diagram of FIG. 9 begins at step 902 and flows directly to step 904. The NMS 126, at step 904, receives at least one call detail record 132 associated with a wireless communication network 102. The NMS 126, at step 906, identifies a set of call flow information from the at least one call detail record 132. The NMS 126, at step 908, analyzes a set of network inventory information 134 associated with the wireless communication network 102. The NMS 126, at step 910, identifies a set of network elements within the wireless communication network 102 based on the analyzing. The NMS 126, at step 912, creates a topology of the wireless communication network 102 based on the set of call flow information and the set of network elements. The control flow exits at step 914.

Information Processing System

Figure 10:
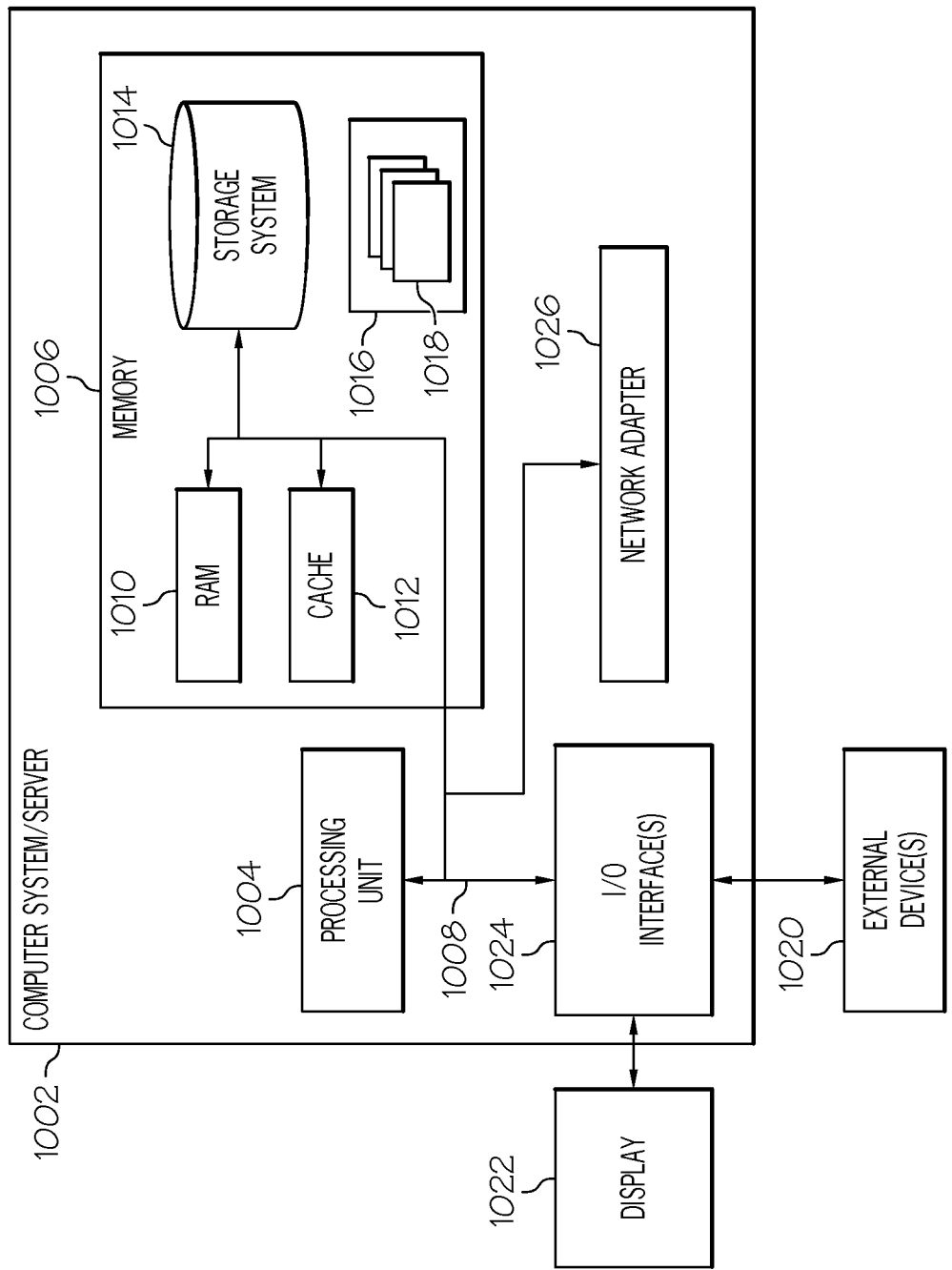
FIG. 10 is a block diagram illustrating one example of an information processing system according to one embodiment of the present invention.

Referring now to FIG. 10, this figure is a block diagram illustrating an information processing system that can be utilized in various embodiments of the present invention. The information processing system 1002 is based upon a suitably configured processing system configured to implement one or more embodiments of the present invention. Any suitably configured processing system can be used as the information processing system 1002 in embodiments of the present invention. The components of the information processing system 1002 can include, but are not limited to, one or more processors or processing units 1004, a system memory 1006, and a bus 1008 that couples various system components including the system memory 1006 to the processor 1004.

The bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 10, the main memory 1006 includes the NMS 126 and its components shown in FIG. 1. Each of these components can reside within the processor 1004, or be a separate hardware component. The system memory 1006 can also include computer system readable media in the form of volatile memory, such as random access memory (RAM) 1010 and/or cache memory 1012. The information processing system 1002 can further include other removable/non-removable, volatile/non-volatile computer system storage media. By way of example only, a storage system 1014 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1008 by one or more data media interfaces. The memory 1006 can include at least one program product having a set of program modules that are configured to carry out the functions of an embodiment of the present invention.

Program/utility 1016, having a set of program modules 1018, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. Program modules 1018 generally carry out the functions and/or methodologies of embodiments of the present invention.

The information processing system 1002 can also communicate with one or more external devices 1020 such as a keyboard, a pointing device, a display 1022, etc.; one or more devices that enable a user to interact with the information processing system 1002; and/or any devices (e.g., network card, modem, etc.) that enable computer system/server 1002 to communicate with one or more other computing devices.

Such communication can occur via I/O interfaces 1024. Still yet, the information processing system 1002 can communicate with one or more networks such as a local area network (LAN), a general wide area network (WAN), and/or a public network (e.g., the Internet) via network adapter 1026. As depicted, the network adapter 1026 communicates with the other components of information processing system 1002 via the bus 1008. Other hardware and/or software components can also be used in conjunction with the information processing system 1002. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, by an information processing system, for estimating network load in a wireless communication network, the method comprising:

obtaining at least one call detail record associated with at least one user equipment device in a wireless communication network, wherein call detail records are generated for user equipment devices in the wireless communication network and comprise recorded data representing a formatted measure of at least one of a given voice session and a given data session participated in by the user equipment devices;

analyzing a topology representing the wireless communication network, wherein the topology is generated by the information processing system based on at least a set of previously received call detail records, and wherein the topology comprises a plurality of nodes each representing a network element within the wireless communication network, and a plurality of edges between at least two nodes in the plurality of nodes, wherein each of the plurality of edges indicates that the at least two nodes are communicatively coupled to each other within the wireless communication network;

identifying a set of paths between two or more nodes in the plurality of nodes corresponding to a set of call flow information within the at least one call detail record; and determining, based on the identifying and the call detail record, a state of each network element represented by the two or more nodes, wherein the state at least identifies a load on the network element.

2. The method of claim 1, wherein determining the state of each network element comprises:

analyzing the at least one call detail record;

identifying, based on the analyzing, a set of call volume data within the at least one call detail record; and determining, based on a set of call volume data, the load on each network element represented by the two or more nodes for which the set of paths were identified.

3. The method of claim 1, wherein identifying the set of paths comprises:

identifying a first node in the topology corresponding to a call origination point in the wireless communication network based on the at least one call detail record;

identifying at least a second node in the topology corresponding to a call destination endpoint in the wireless communication network based on the at least one call detail record; and determining a set of shortest paths between the first node and the second node based on one or more shortest path criteria.

4. The method of claim 1, further comprising:

modifying the topology by at least one of adding and removing one or more nodes representing one or more network elements in the wireless communication network; and determining, based on the modifying and the call detail record, a new state of one or more network elements represented by the two or more nodes for which the set of paths were identified.

5. The method of claim 1, further comprising:

modifying at least one attribute associated with one or more network elements represented by a node in the topology; and determining, based on the modifying and the call detail record, a new state of one or more network elements represented by the two or more nodes for which the set of paths were identified.

6. The method of claim 1, further comprising:

identifying the set of call flow information from the at least one call detail record;

analyzing a set of network inventory information associated with the wireless communication network;

identifying, based on analyzing the set of network inventory information, a set of network elements within the wireless communication network; and creating the topology based on the set of call flow information and the set of network elements.

7. The method of claim 1, wherein the set of call flow information identifies at least one of:

a source cell site associated with a call corresponding to the at least one call detail record;

a destination cell site associated with the call; and one or more support nodes that managed the call within the wireless communication network.

8. An information processing system for estimating network load in a wireless communication network, the information processing system comprising:

a memory;

a processor communicatively coupled to the memory; and a network monitoring system communicatively coupled to the memory and the processor, wherein the network monitoring system is configured to perform a method comprising:

obtaining at least one call detail record associated at least one user equipment device in a wireless communication network, wherein call detail records are generated for user equipment devices in the wireless communication network and comprise recorded data representing a formatted measure of at least one of a given voice session and a given data session participated in by the user equipment devices;

analyzing a topology representing the wireless communication network, wherein the topology is generated by the information processing system based on at least a set of previously received call detail records, and wherein the topology comprises a plurality of nodes each representing a network element within the wireless communication network, and a plurality of edges between at least two nodes in the plurality of nodes, wherein each of the plurality of edges indicates that the at least two nodes are communicatively coupled to each other within the wireless communication network;

identifying a set of paths between two or more nodes in the plurality of nodes corresponding to a set of call flow information within the at least one call detail record; and determining, based on the identifying and the call detail record, a state of each network element represented by the two or more nodes, wherein the state at least identifies a load on the network element.

9. The information processing system of claim 8, wherein determining the state of each network element comprises:

analyzing the at least one call detail record;

identifying, based on the analyzing, a set of call volume data within the at least one call detail record; and determining, based on a set of call volume data, the load on each network element represented by the two or more nodes for which the set of paths were identified.

10. The information processing system of claim 8, wherein identifying the set of paths comprises:

identifying a first node in the topology corresponding to a call origination point in the wireless communication network based on the at least one call detail record;

identifying at least a second node in the topology corresponding to a call destination endpoint in the wireless communication network based on the at least one call detail record; and determining a set of shortest paths between the first node and the second node based on one or more shortest path criteria.

11. The information processing system of claim 8, wherein the method further comprises:

modifying the topology by at least one of adding and removing one or more nodes representing one or more network elements in the wireless communication network; and determining, based on the modifying and the call detail record, a new state of one or more network elements represented by the two or more nodes for which the set of paths were identified.

12. The information processing system of claim 8, wherein the method further comprises:

modifying at least one attribute associated with one or more network elements represented by a node in the topology; and determining, based on the modifying and the call detail record, a new state of one or more network elements represented by the two or more nodes for which the set of paths were identified.

13. The information processing system of claim 8, wherein the method further comprises:

identifying the set of call flow information from the at least one call detail record;

analyzing a set of network inventory information associated with the wireless communication network;

identifying, based on analyzing the set of network inventory information, a set of network elements within the wireless communication network; and creating the topology based on the set of call flow information and the set of network elements.

14. A computer program storage product for estimating network load in a wireless communication network, the computer program storage product comprising a non-transitory storage medium readable by a processing circuit and storing instructions for execution by the processing circuit for performing a method, the method comprising:

obtaining at least one call detail record associated at least one user equipment device in a wireless communication network, wherein call detail records are generated for user equipment devices in the wireless communication network and comprise recorded data representing a formatted measure of at least one of a given voice session and a given data session participated in by the user equipment devices;

analyzing a topology representing the wireless communication network, wherein the topology is generated by the processing circuit based on at least a set of previously received call detail records, and wherein the topology comprises a plurality of nodes each representing a network element within the wireless communication network, and a plurality of edges between at least two nodes in the plurality of nodes, wherein each of the plurality of edges indicates that the at least two nodes are communicatively coupled to each other within the wireless communication network;

identifying a set of paths between two or more nodes in the plurality of nodes corresponding to a set of call flow information within the at least one call detail record; and determining, based on the identifying and the call detail record, a state of each network element represented by the two or more nodes, wherein the state at least identifies a load on the network element.

15. The computer program storage product of claim 14, wherein determining the state of each network element comprises:

analyzing the at least one call detail record;

identifying, based on the analyzing, a set of call volume data within the at least one call detail record; and determining, based on a set of call volume data, the load on each network element represented by the two or more nodes for which the set of paths were identified.

16. The computer program storage product of claim 14, wherein identifying the set of paths comprises:

identifying a first node in the topology corresponding to a call origination point in the wireless communication network based on the at least one call detail record;

identifying at least a second node in the topology corresponding to a call destination endpoint in the wireless communication network based on the at least one call detail record; and determining a set of shortest paths between the first node and the second node based on one or more shortest path criteria.

17. The computer program storage product of claim 14, wherein the method further comprises:

modifying the topology by at least one of adding and removing one or more nodes representing one or more network elements in the wireless communication network; and determining, based on the modifying and the call detail record, a new state of one or more network elements represented by the two or more nodes for which the set of paths were identified.

18. The computer program storage product of claim 14, wherein the method further comprises:

modifying at least one attribute associated with one or more network elements represented by a node in the topology; and determining, based on the modifying and the call detail record, a new state of one or more network elements represented by the two or more nodes for which the set of paths were identified.

19. The computer program storage product of claim 14, wherein the method further comprises:

identifying the set of call flow information from the at least one call detail record;

analyzing a set of network inventory information associated with the wireless communication network;

identifying, based on analyzing the set of network inventory information, a set of network elements within the wireless communication network; and creating the topology based on the set of call flow information and the set of network elements.

20. The computer program storage product of claim 14, wherein the set of call flow information identifies at least one of:

a source cell site associated with a call corresponding to the at least one call detail record;

a destination cell site associated with the call; and one or more support nodes that managed the call within the wireless communication network.

* * * * *